US011260481B2

(12) United States Patent
Maeda

(10) Patent No.: US 11,260,481 B2
(45) Date of Patent: Mar. 1, 2022

(54) SCREW GUIDE DEVICE AND SCREW-FASTENING ROBOT SYSTEM

(71) Applicant: FANUC CORPORATION, Yamanashi (JP)

(72) Inventor: Yoshihide Maeda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 82 days.

(21) Appl. No.: 15/945,054

(22) Filed: Apr. 4, 2018

(65) Prior Publication Data
US 2018/0333811 A1 Nov. 22, 2018

(30) Foreign Application Priority Data

May 19, 2017 (JP) .............................. JP2017-100344

(51) Int. Cl.
*B23P 19/06* (2006.01)
*B23P 19/00* (2006.01)
*B23P 19/12* (2006.01)

(52) U.S. Cl.
CPC ............. *B23P 19/06* (2013.01); *B23P 19/001* (2013.01); *B23P 19/006* (2013.01); *B23P 19/12* (2013.01); *B23P 19/065* (2013.01)

(58) Field of Classification Search
CPC ....... B25B 23/04; B25B 23/10; B25B 23/103; B25B 23/105; B25B 23/106;
(Continued)

(56) References Cited

U.S. PATENT DOCUMENTS 3,056,441 A * 10/1962 Helms ..................... B25B 23/00
81/429
3,233,752 A * 2/1966 Lagler ................... B23P 19/007
269/55
(Continued)

FOREIGN PATENT DOCUMENTS

EP 2 730 367 A1 5/2014
JP S62-127737 U 8/1987
(Continued)

OTHER PUBLICATIONS

Japanese Office Action dated Dec. 18, 2018, in connection with corresponding JP Application No. 2017-100344 (9 pgs., including machine-generated English translation).

*Primary Examiner* — Joel D Crandall
(74) *Attorney, Agent, or Firm* — Maier & Maier, PLLC

(57) ABSTRACT

A screw fastening process can be performed by reliably positioning a screw in a screw hole while suppressing a decrease in the degree of freedom of movement of a screw fastening device. Provided is a screw guide device that guides a screw to a screw hole. The screw is fastened by a screw fastening device to the screw hole formed in a workpiece to be fastened to be fastened. The screw guide device includes a guide device body provided at a support that supports the workpiece to be fastened, and also includes a guide member that is provided in the guide device body and that is openable and closable in a radial direction orthogonal to a central axis of a shaft section of the screw. The guide member forms a screw insert through which the shaft section is inserted when the guide member is in a closed state.

10 Claims, 11 Drawing Sheets

(58) Field of Classification Search
CPC .... B25B 23/108; Y10S 901/41; B23P 19/006; B23B 47/28; B23B 47/287
USPC .................................................... 901/36–39
See application file for complete search history.

(56) References Cited

U.S. PATENT DOCUMENTS

| | | | | |
|---|---|---|---|---|
| 4,260,940 | A | * | 4/1981 | Engelberger .......... B23P 21/002 318/562 |
| 5,733,089 | A | * | 3/1998 | Albright .................. B21J 15/32 221/310 |
| 2008/0168639 | A1 | * | 7/2008 | Otake ..................... B25J 9/0084 29/56.6 |
| 2011/0022217 | A1 | * | 1/2011 | Asamizu ................ B25J 9/1697 700/114 |
| 2014/0125080 | A1 | * | 5/2014 | Dan ...................... B25J 15/0019 294/213 |
| 2014/0263386 | A1 | * | 9/2014 | Neumeier ................ G07F 11/02 221/1 |
| 2015/0314888 | A1 | * | 11/2015 | Reid ...................... B25J 9/1687 700/117 |
| 2016/0082600 | A1 | * | 3/2016 | Nagatsuka ........... B25J 15/0028 294/207 |

FOREIGN PATENT DOCUMENTS

| | | | | |
|---|---|---|---|---|
| JP | 63097857 | A | * 4/1988 | ........... B23P 19/042 |
| JP | H10-249653 | A | 9/1998 | |
| JP | 2008-254100 | A | 10/2008 | |
| JP | 2008-302482 | A | 12/2008 | |
| JP | 2012-210678 | A | 11/2012 | |
| WO | 2013/005330 | A1 | 1/2013 | |
| WO | WO-2013005330 | A1 * | 1/2013 | .......... B25J 15/0028 |

* cited by examiner

SCREW GUIDE DEVICE AND SCREW-FASTENING ROBOT SYSTEM

CROSS-REFERENCE TO RELATED APPLICATIONS

This application is based on Japanese Patent Application No. 2017-100344, the contents of which are incorporated herein by reference.

FIELD

The present invention relates to screw guide devices and screw-fastening robot systems.

BACKGROUND

In the related art, a screw fastening device is used when fastening a screw to a workpiece having a screw hole. The screw fastening device includes a main body having a shaft that is rotationally driven about its central axis by a motor, and also includes a socket that is attached to the distal end of the shaft and that rotates the head of a screw. By attaching such a screw fastening device to a robot, the process for fastening the screw to the workpiece to be fastened can be automated.

When fastening the screw to the screw hole by using the screw fastening device, the screw has to be positioned and inserted into the screw hole.

In order to achieve this, for example, a known bolt inserting device includes a positioning mechanism that positions a screw in a screw hole by clamping and holding the screw using a pair of blocks (e.g., see Japanese Unexamined Patent Application, Publication No. Hei 10-249653).

Another known screw fastening device includes a screw holding mechanism at the lower end of a frame where the screw fastening device is provided. The screw holding mechanism positions a screw to a screw hole by holding the screw using a pair of screw holding members (e.g., see Japanese Unexamined Patent Application, Publication No. 2008-302482).

SUMMARY

An object of the present invention is to provide a screw guide device and a screw-fastening robot system that can perform a screw fastening process by reliably positioning a screw in a screw hole while suppressing a decrease in the degree of freedom of movement of a screw fastening device.

Solution to Problem

An aspect of the present invention provides a screw guide device that guides a screw to a screw hole, the screw being fastened by a screw fastening device to the screw hole formed in a workpiece to be fastened. The screw guide device includes a guide device body provided at a support that supports the workpiece to be fastened, and also includes a guide member that is provided in the guide device body and that is openable and closable in a radial direction orthogonal to a central axis of a shaft section of the screw. The guide member forms a screw insert through which the shaft section is inserted when the guide member is in a closed state.

In the above aspect, the guide member may include a plurality of guide bits provided in a circumferential direction around a central axis of the screw. Each of the guide bits may be movable in the radial direction. The screw insert may be formed by being surrounded by the plurality of guide bits.

In the above aspect, the guide member may be disposed at a position facing an opening end of the screw hole between the workpiece to be fastened and the screw fastening device, and the guide device body may be disposed at an outer side of the workpiece to be fastened in a direction intersecting with a direction in which the workpiece to be fastened and the screw fastening device face each other.

In the above aspect, the guide member may have a tapered guide surface whose diameter gradually decreases toward the screw hole along the central axis.

In the above aspect, a diameter of the screw insert at an end thereof close to the screw hole may be smaller than or equal to an inner diameter of the screw hole.

In the above aspect, the guide device body may be a first actuator that opens and closes the guide member in the radial direction.

In the above aspect, the screw guide device may further include a biasing member that biases the guide member in a closing direction.

In the above aspect, the screw guide device may further include a second actuator that causes the guide member to retract from between the workpiece to be fastened and the screw fastening device in a direction intersecting with a direction in which the workpiece to be fastened and the screw fastening device face each other.

In the above aspect, the screw guide device may further include a third actuator that causes the guide member to retract away from the workpiece to be fastened in a direction in which the workpiece to be fastened and the screw fastening device face each other.

Another aspect of the present invention provides a screw-fastening robot system including the aforementioned screw guide device, a support that supports the workpiece to be fastened having the screw hole, a robot having an arm that is movable relative to the workpiece to be fastened, the screw fastening device that is attached to a distal end of the arm and that fastens the screw to the screw hole in the workpiece to be fastened, and a control device that controls the robot, the screw fastening device, and the screw guide device.

DETAILED DESCRIPTION

A screw guide device 5 and a screw-fastening robot system 1 according to an embodiment of the present invention will be described below with reference to the drawings.

Figure 1:
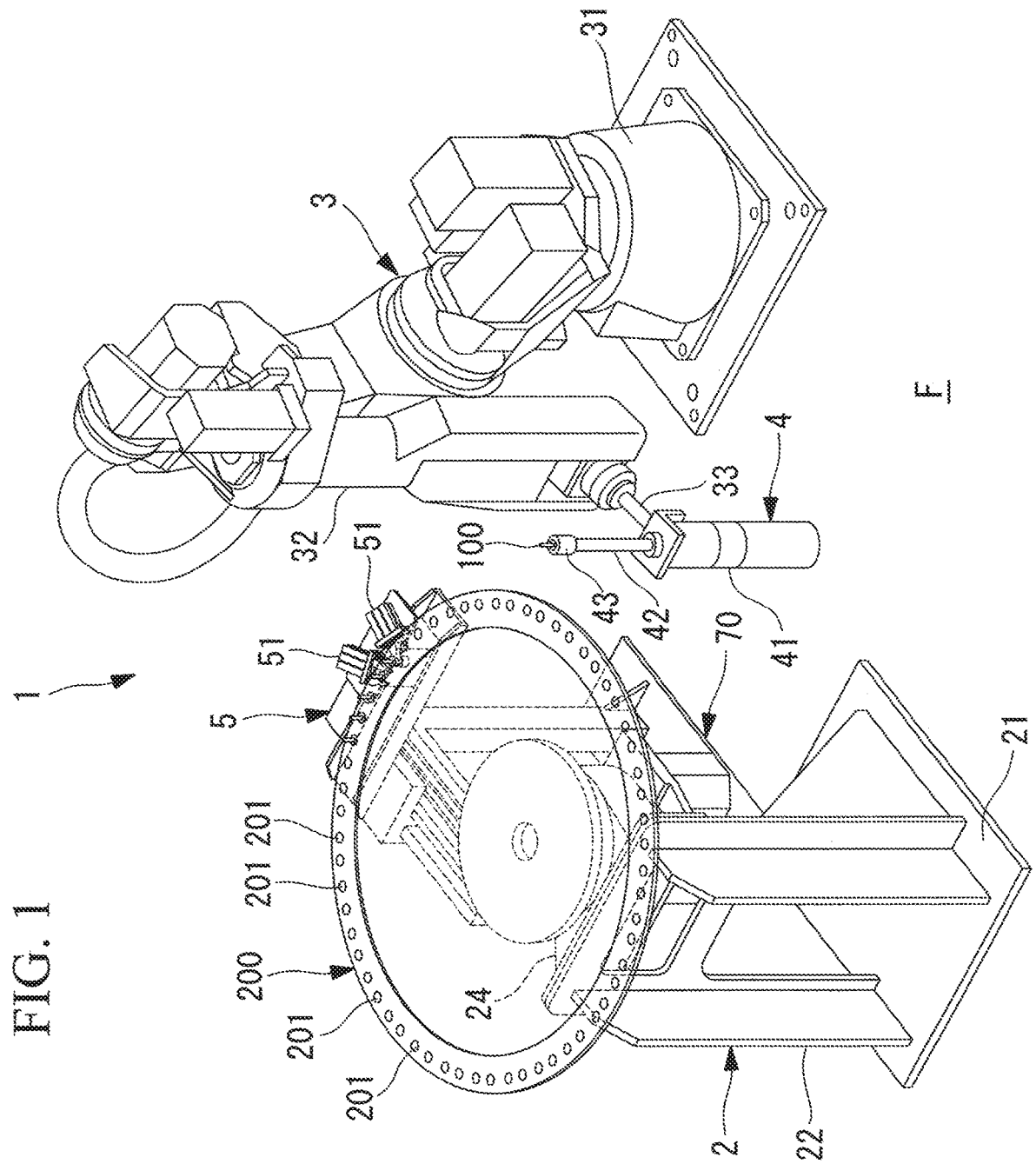
FIG. 1 illustrates the overall configuration of a screw-fastening robot system according to an embodiment of the present invention.
Figure 2:
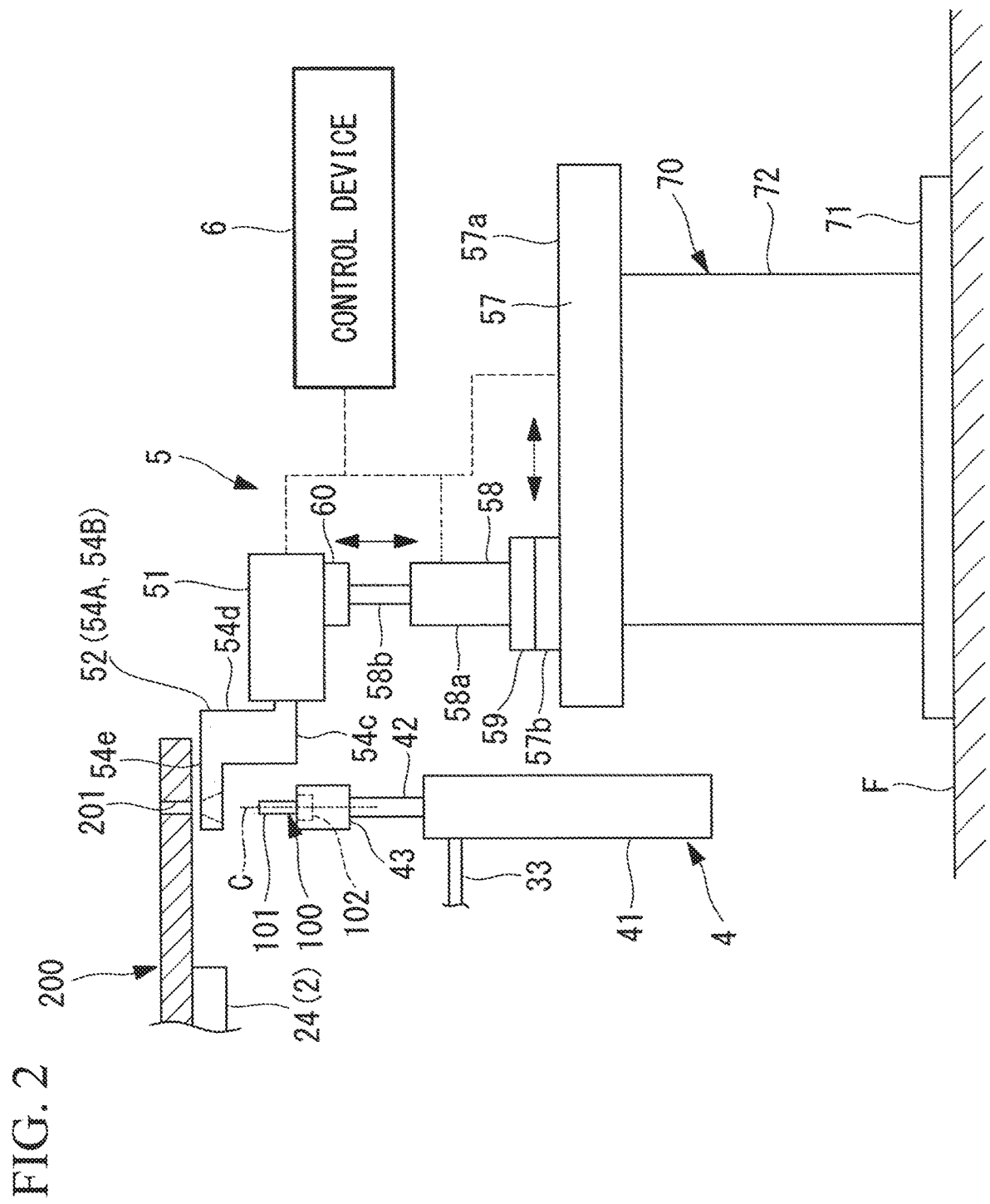
FIG. 2 is a side view illustrating a screw fastening device and a screw guide device constituting the screw-fastening robot system in FIG. 1.

As shown in FIG. 1, the screw-fastening robot system 1 according to this embodiment includes a support 2 that supports a workpiece 200 to be fastened, a robot 3, a screw fastening device 4, a screw guide device 5, and a control device 6 (see FIG. 2).

In this embodiment, the workpiece 200 is, for example, disk-shaped and has an outer peripheral section provided with a plurality of screw holes 201 formed apart from one another in the circumferential direction. The shape of the workpiece 200 is not limited to a disk shape and may be any shape. The set positions and number of screw holes 201 are also arbitrary.

The support 2 includes a base 21 fixed to a floor F, pillars 22 extending upward from the base 21, and a workpiece support member 24 that extends horizontally from the pillars 22 and that supports the center of the workpiece 200 from below. The workpiece support member 24 has a rotating mechanism that supports the workpiece 200 in a rotatable manner about the center thereof.

The robot 3 includes a base 31 provided on the floor F and a multiaxial articulated arm 32 provided on the base 31.

FIG. 2 is a side view illustrating the screw fastening device 4 and the screw guide device 5 constituting the screw-fastening robot system 1 in FIG. 1.

The screw fastening device 4 is provided at the distal end of the arm 32 of the robot 3. The screw fastening device 4 is movable relative to the workpiece 200 by being driven by the arm 32. As shown in FIGS. 1 and 2, the screw fastening device 4 is a so-called nut runner and includes a screw-fastening-device body 41 supported by a hand 33 provided at the distal end of the arm 32, a shaft 42 rotationally driven about the central axis thereof by the screw-fastening-device body 41, and a socket 43 provided at the distal end of the shaft 42.

The socket 43 has a substantially cylindrical shape with its inner peripheral surface engageable with a head 102 of a screw 100 to be fastened to a screw hole 201. A screw feeding mechanism (not shown) feeds screws 100 one-by-one to the socket 43. The screw 100 is supported in a state where its head 102 is accommodated within the socket 43 and its shaft section 101 extends upward.

In a state where the socket 43 is engaged with the head 102 of the screw 100, the screw fastening device 4 causes the screw-fastening-device body 41 to rotationally drive the shaft 42 about its axis so as to rotate the screw 100.

Figure 3:
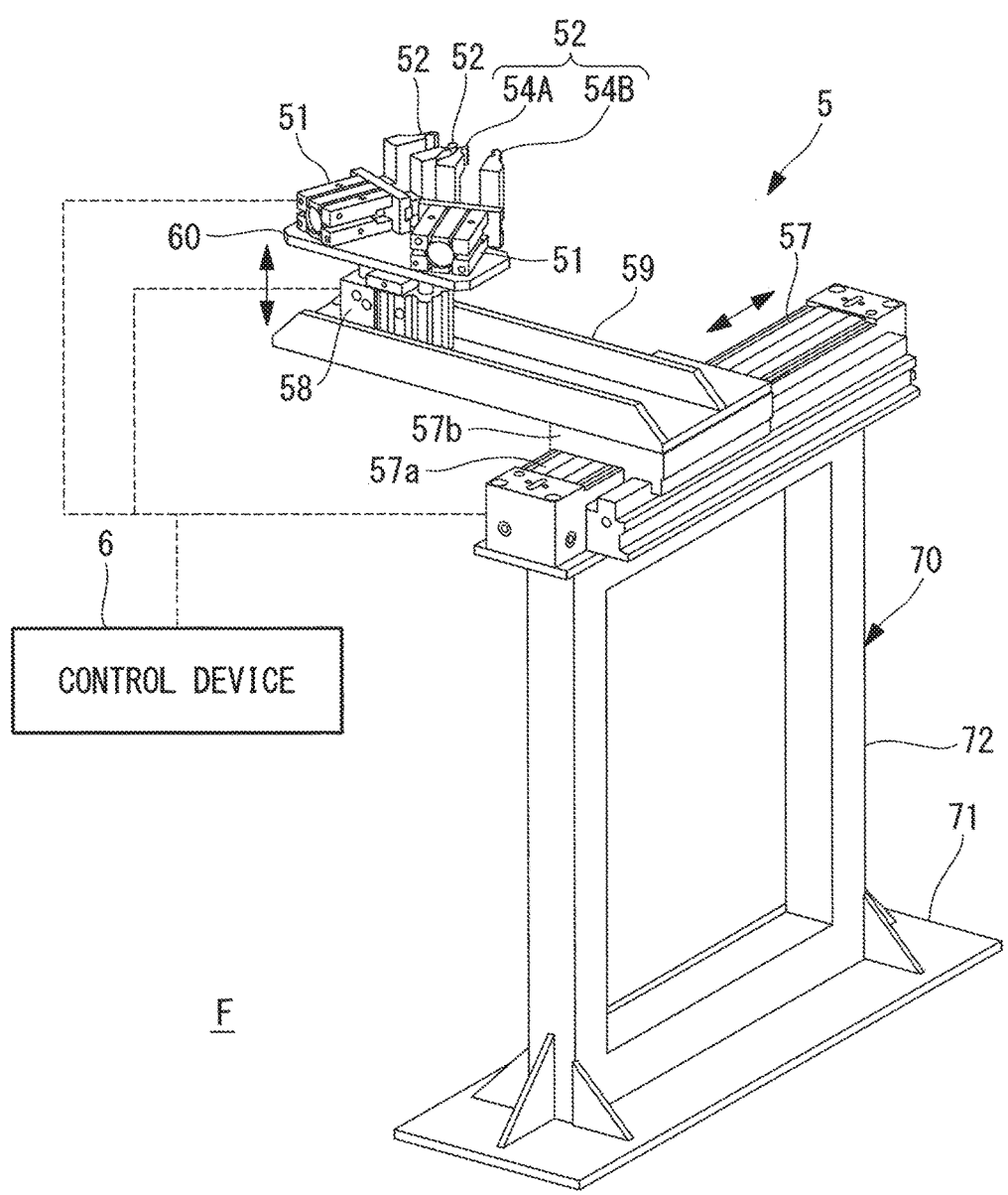
FIG. 3 is a perspective view illustrating the configuration of the screw guide device of the screw-fastening robot system in FIG. 1.

FIG. 3 is a perspective view illustrating the configuration of the screw guide device 5 of the screw-fastening robot system 1 in FIG. 1.

The screw guide device 5 guides, to a screw hole 201 formed in the workpiece 200, a screw 100 to be fastened to the screw hole 201 by the screw fastening device 4. As shown in FIGS. 2 and 3, the screw guide device 5 includes guide device bodies 51 and guide members 52.

The guide device bodies 51 are provided above a guide-device support member 70, which is provided on the floor F, with a radial-direction advancing-retracting actuator (second actuator) 57 and an elevating actuator (third actuator) 58 interposed therebetween.

The guide-device support member 70 includes a base 71 fixed on the floor F and a pillar 72 extending upward from the base 71.

The radial-direction advancing-retracting actuator 57 is provided on the pillar 72. The radial-direction advancing-retracting actuator 57 includes an actuator body 57a extending in the radial direction of the workpiece 200 supported by the support 2, and also includes a slider 57b that advances and retracts in the radial direction of the workpiece 200 below the workpiece 200 supported by the support 2.

A support plate 59 (see FIG. 3) located within a horizontal plane is provided on the slider 57b. The elevating actuator 58 is provided on the support plate 59. The elevating actuator 58 includes an actuator body 58a fixed on the support plate 59 and also includes a rod 58b that is driven in an advancing and retracting manner in the vertical direction by the actuator body 58a.

The guide device bodies 51 are attached to the upper end (i.e., the distal end) of the rod 58b of the elevating actuator 58 by means of a bracket plate 60. Although the bracket plate 60 is provided with a pair of guide device bodies 51 (and a pair of guide members 52) in this embodiment, the number thereof may be one.

Figure 4:
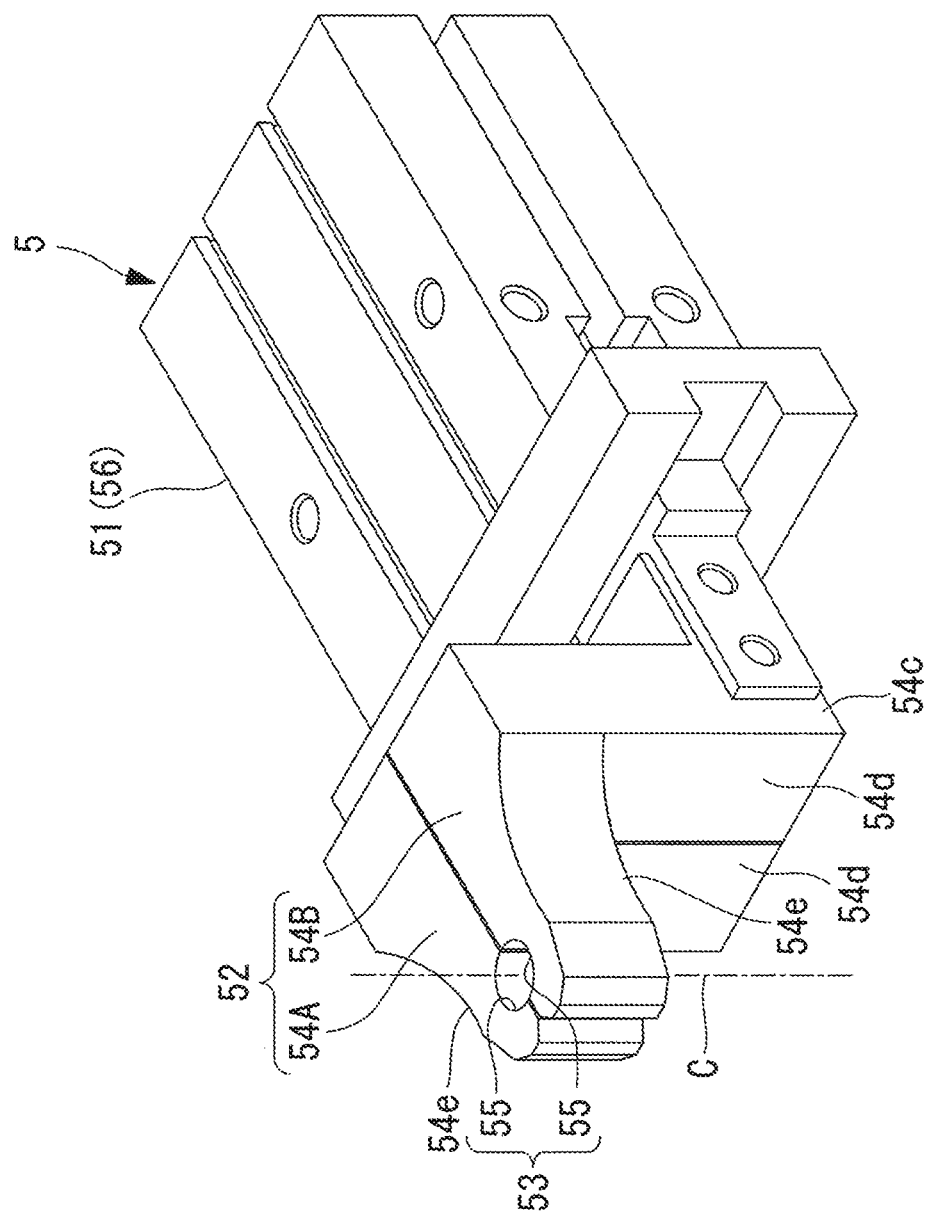
FIG. 4 is a perspective view illustrating a guide device body and a guide member constituting the screw guide device in FIG. 3.
Figure 5:
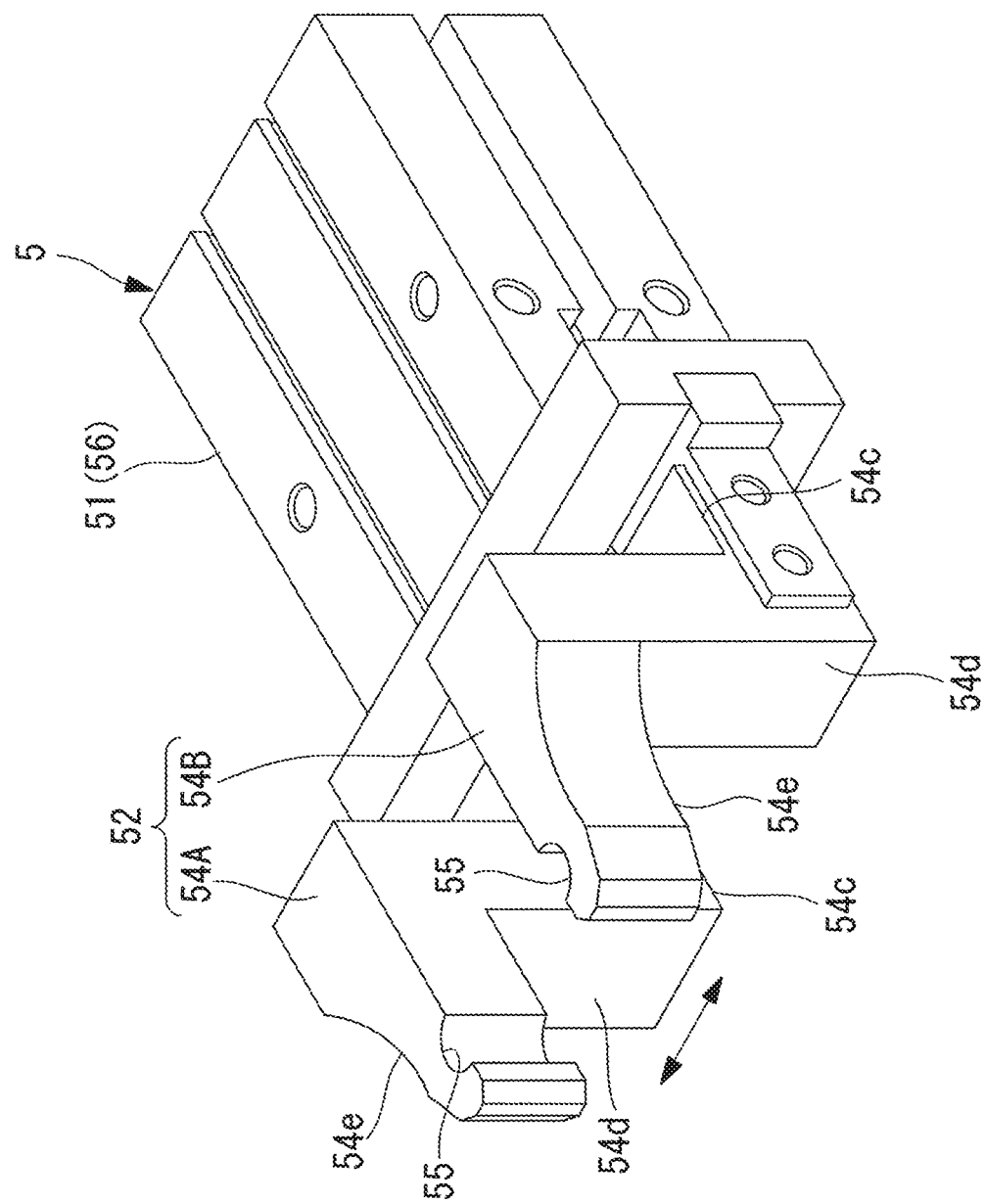
FIG. 5 is a perspective view illustrating the guide member in FIG. 4 in an opened state.

FIG. 4 is a perspective view illustrating one of the guide device bodies 51 and one of the guide members 52 constituting the screw guide device 5 in FIG. 3. FIG. 5 is a perspective view illustrating the guide member 52 in FIG. 4 in an opened state.

As shown in FIGS. 4 and 5, the guide device body 51 is an opening-closing actuator (first actuator) 56 that opens and closes a pair of guide bits 54A and 54B constituting the guide member 52 in the radial direction of the screw hole 201 formed in the workpiece 200.

The guide member 52 is constituted of the pair of guide bits 54A and 54B. The pair of guide bits 54A and 54B are disposed so as to be positioned at opposite sides, in the radial direction, of a central axis C of the shaft section 101 of the screw 100 to be guided. In other words, the guide bits 54A and 54B are disposed in the circumferential direction around the central axis C of the shaft section 101 of the screw 100.

As shown in FIGS. 2 and 4, each of the guide bits 54A and 54B integrally has an extending section 54c extending toward the radially inward side of the workpiece 200 below the workpiece 200 supported by the support 2, an upright section 54d extending upright from the distal end of the extending section 54c, and an arm section 54e extending toward the radially inward side of the workpiece 200 from the upper end of the upright section 54d. As shown in FIGS. 4 and 5, the opening-closing actuator 56 (guide device body 51) opens and closes the guide bits 54A and 54B by moving them away from and toward each other in the radial direction extending orthogonally to the central axis C of the shaft section 101 of the screw 100 to be fastened to the screw hole 201.

As shown in FIG. 4, when the guide bits 54A and 54B are in a closed state, the arm sections 54e are in contact with each other. The distal end of the arm section 54e of each of the guide bits 54A and 54B has a guide surface 55 that is depressed in a semicircular shape in cross section. When the guide bits 54A and 54B are in a closed state, the guide surface 55 of the guide bit 54A and the guide surface 55 of the guide bit 54B form a screw insert 53 through which the shaft section 101 of the screw 100 to be fastened to the screw hole 201 is inserted. Consequently, the screw insert 53 is formed by being surrounded by the plurality of guide bits 54A and 54B.

Each of the guide surfaces 55 gradually decreases in radius (curvature radius) from the lower side toward the upper side along the central axis C of the shaft section 101 of the screw 100. Thus, the screw insert 53 is tapered such as to gradually decrease in radius (curvature radius) toward the screw hole 201 in the workpiece 200 located above.

Figure 6:
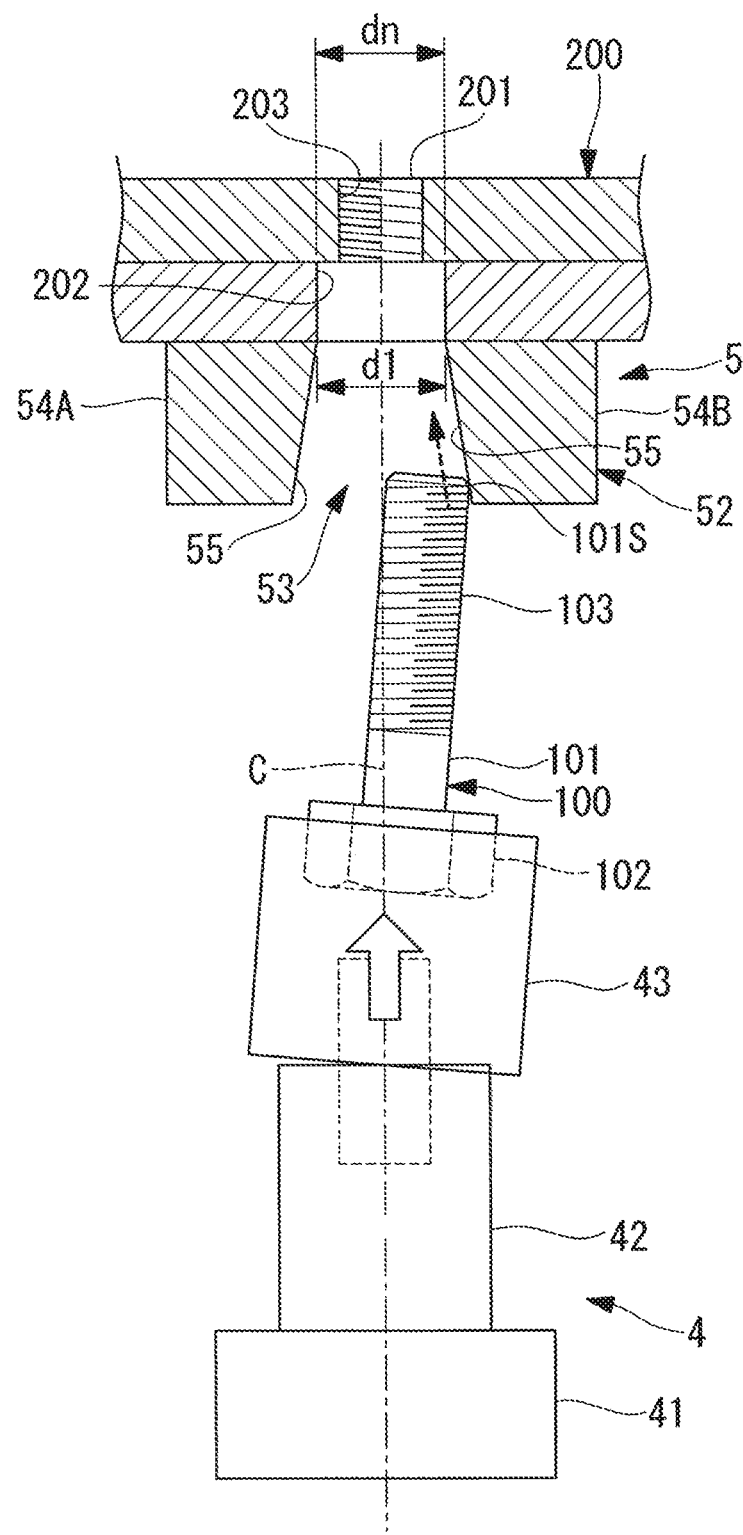
FIG. 6 is a cross-sectional view in which the guide member shown in FIG. 4 is in a closed state and is disposed at a position facing an opening end of a screw hole.

FIG. 6 is a cross-sectional view in which the guide member 52 shown in FIG. 4 is in a closed state and is disposed at a position facing an opening end 202 of the screw hole 201.

As shown in FIG. 6, the screw insert 53 is formed such that the upper end thereof close to the screw hole 201 has a diameter d1 that is smaller than or equal to an inner diameter do of the opening end 202 of the screw hole 201.

Figure 7:
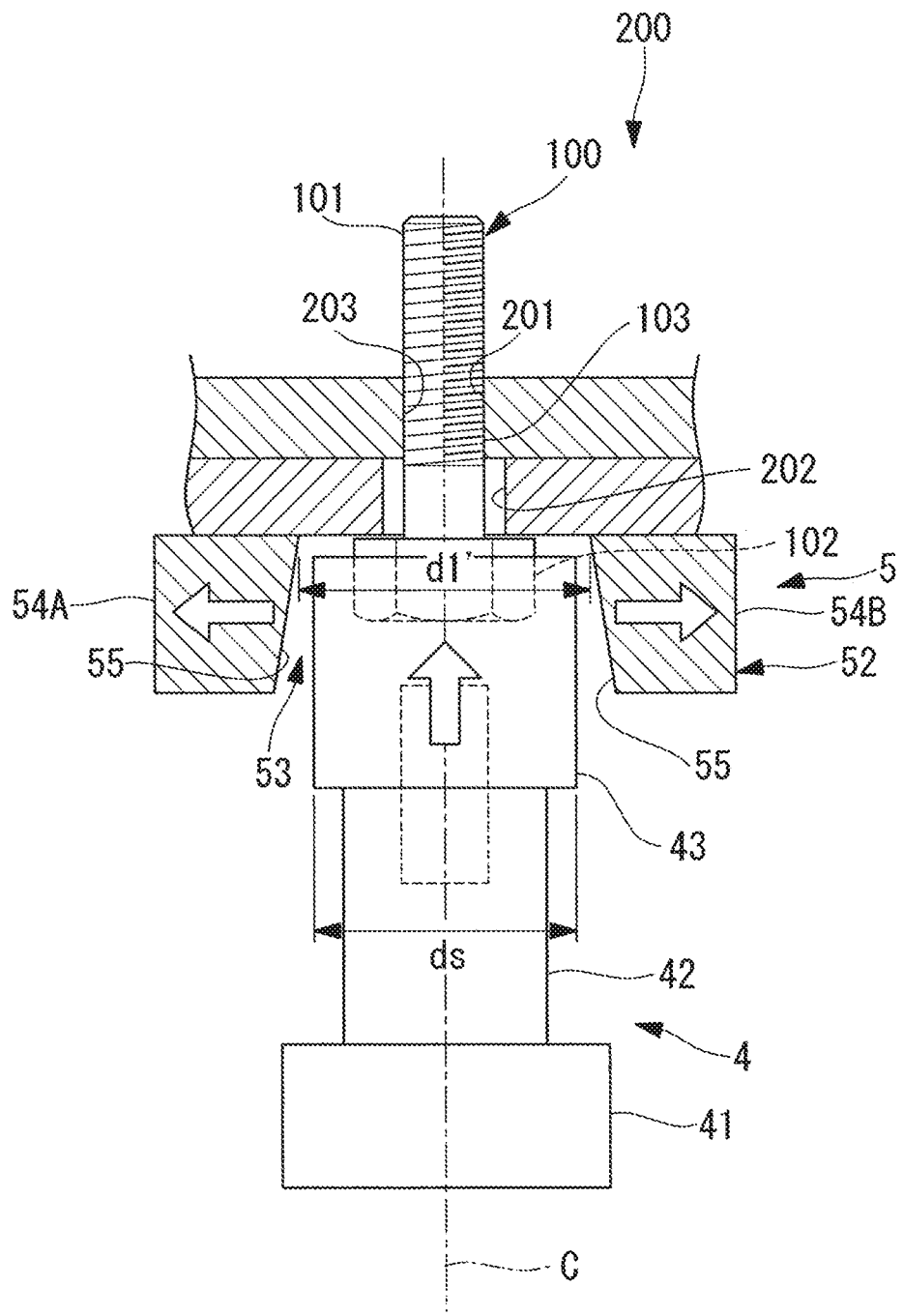
FIG. 7 is a cross-sectional view in which the guide member shown in FIG. 6 is in an opened state.

FIG. 7 is a cross-sectional view in which the guide member 52 shown in FIG. 4 is in an opened state and is disposed at the position facing the opening end 202 of the screw hole 201.

As shown in FIG. 7, when the guide bits 54A and 54B are opened by the opening-closing actuator 56, a diameter d1' of the screw insert 53 at the upper end thereof close to the screw hole 201 becomes larger than or equal to the head 102 of the screw 100 as well as an outer diameter ds of the socket 43.

The screw guide device 5 described above is provided at the floor F side (i.e., stationary side) where the support 2 that supports the workpiece 200 is provided, instead of being provided at the screw fastening device 4 side (i.e., movable side) where the arm 32 of the robot 3 is provided.

Each guide device body 51 of the screw guide device 5 is disposed at the outer side of the workpiece 200 in a direction intersecting with a direction in which the workpiece 200 and the screw fastening device 4 face each other. Each guide member 52 of the screw guide device 5 is disposed at a position where it faces the opening end 202 of the screw hole 201 between the workpiece 200 and the screw fastening device 4.

The radial-direction advancing-retracting actuator 57 can cause the screw guide device 5 to retract radially outward from the workpiece 200 from between the workpiece 200 and the screw fastening device 4 in the radial direction of the workpiece 200 that intersects with the vertical direction in which the workpiece 200 and the screw fastening device 4 face each other. Because the radial-direction advancing-retracting actuator 57 is capable of advancing and retracting in the radial direction of the workpiece 200, the radial-direction advancing-retracting actuator 57 switches between the advancing and retracting modes in accordance with the diameter of the disk-shaped workpiece 200 supported by the support 2. Specifically, in a case where various types with different diameters are used as workpieces 200 having screw holes 201, such a case is dealt with by the radial-direction advancing-retracting actuator 57 switching between the modes.

The elevating actuator 58 can cause the screw guide device 5 to retract downward away from the workpiece 200 in the vertical direction in which the workpiece 200 and the screw fastening device 4 face each other.

The control device 6 controls the robot 3, the screw fastening device 4, and the screw guide device 5 so as to fasten a screw 100 to a screw hole 201 formed in the workpiece 200. The following description relates to a method of controlling the screw-fastening robot system 1 by the control device 6.

Figure 8:
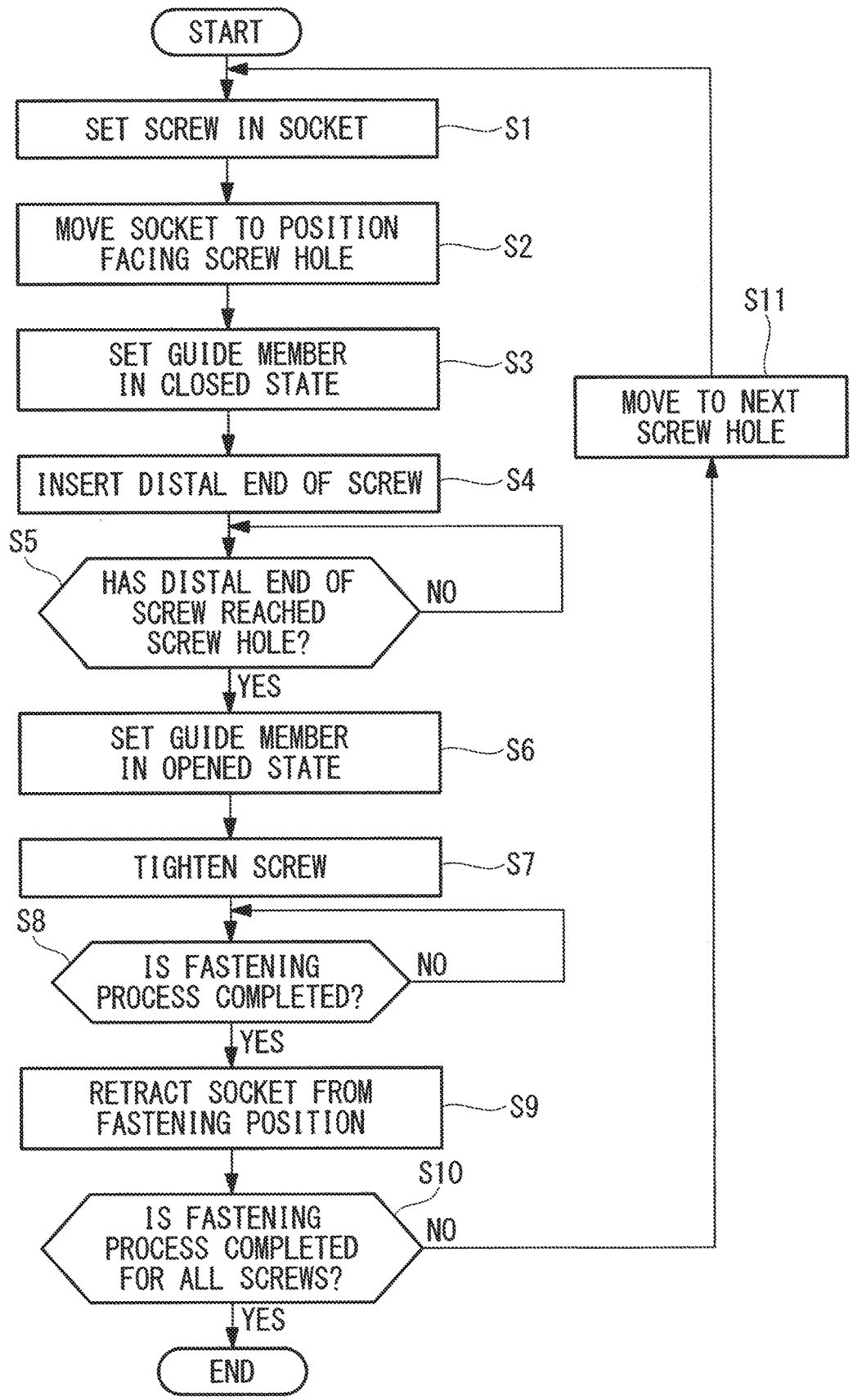
FIG. 8 is a flowchart illustrating the flow of a process for fastening a screw to the screw hole in the screw-fastening robot system in FIG. 1.

FIG. 8 is a flowchart illustrating the flow of a process for fastening a screw 100 to a screw hole 201 in the screw-fastening robot system 1.

As shown in FIG. 8, in order to fasten a screw 100 to a screw hole 201, the screw 100 is first set in the socket 43 of the screw fastening device 4 (step S1). In order to achieve this, the control device 6 feeds the screw 100 from the screw feeding mechanism (not shown). As shown in FIG. 2, the screw 100 is set such that the head 102 thereof is accommodated within the socket 43 and the shaft section 101 thereof extends upward.

Subsequently, the control device 6 actuates the arm 32 of the robot 3 so as to move the screw fastening device 4 provided at the distal end of the arm 32, thereby causing the socket 43 to move to a position where it faces, from below, the screw hole 201 in the workpiece 200 supported by the support 2 (step S2).

The control device 6 controls the screw guide device 5 in advance such that the radial-direction advancing-retracting actuator 57 causes the guide device body 51 to advance toward the radially inner side of the workpiece 200 and the elevating actuator 58 causes the guide device body 51 to move upward, thereby causing the guide member 52 to move to a position where it faces the screw hole 201 in the workpiece 200 from below.

Then, as shown in FIG. 6, the control device 6 causes the opening-closing actuator 56, which serves as the guide device body 51, to set the pair of guide bits 54A and 54B constituting the guide member 52 to a closed state (step S3). Accordingly, the screw insert 53 formed in the guide member 52 in the closed state is disposed coaxially with the screw hole 201 below the screw hole 201.

Subsequently, the control device 6 actuates the arm 32 of the robot 3 so as to move the screw fastening device 4 upward, thereby starting the insertion of the shaft section 101 of the screw 100 into the screw hole 201 (step S4). Thus, as shown in FIG. 6, a distal end 101s of the shaft section 101 of the screw 100 set in the socket 43 is inserted into the screw insert 53. The screw insert 53 is tapered due to the guide surfaces 55. Accordingly, even if the shaft section 101 is tilted relative to the central axis C of the screw hole 201, the distal end 101s of the shaft section 101 slides on the guide surfaces 55 as the shaft section 101 is moved upward, so that the tilt of the shaft section 101 is corrected. Consequently, the distal end 101s of the shaft section 101 of the screw 100 is inserted into the screw hole 201 through the screw insert 53.

The control device 6 monitors the movement of the arm 32 of the robot 3 and detects whether or not the screw fastening device 4 has ascended to a position where the distal end 101s of the shaft section 101 of the screw 100 set in the socket 43 has reached a female thread section 203 of the screw hole 201 (step S5).

Figure 9:
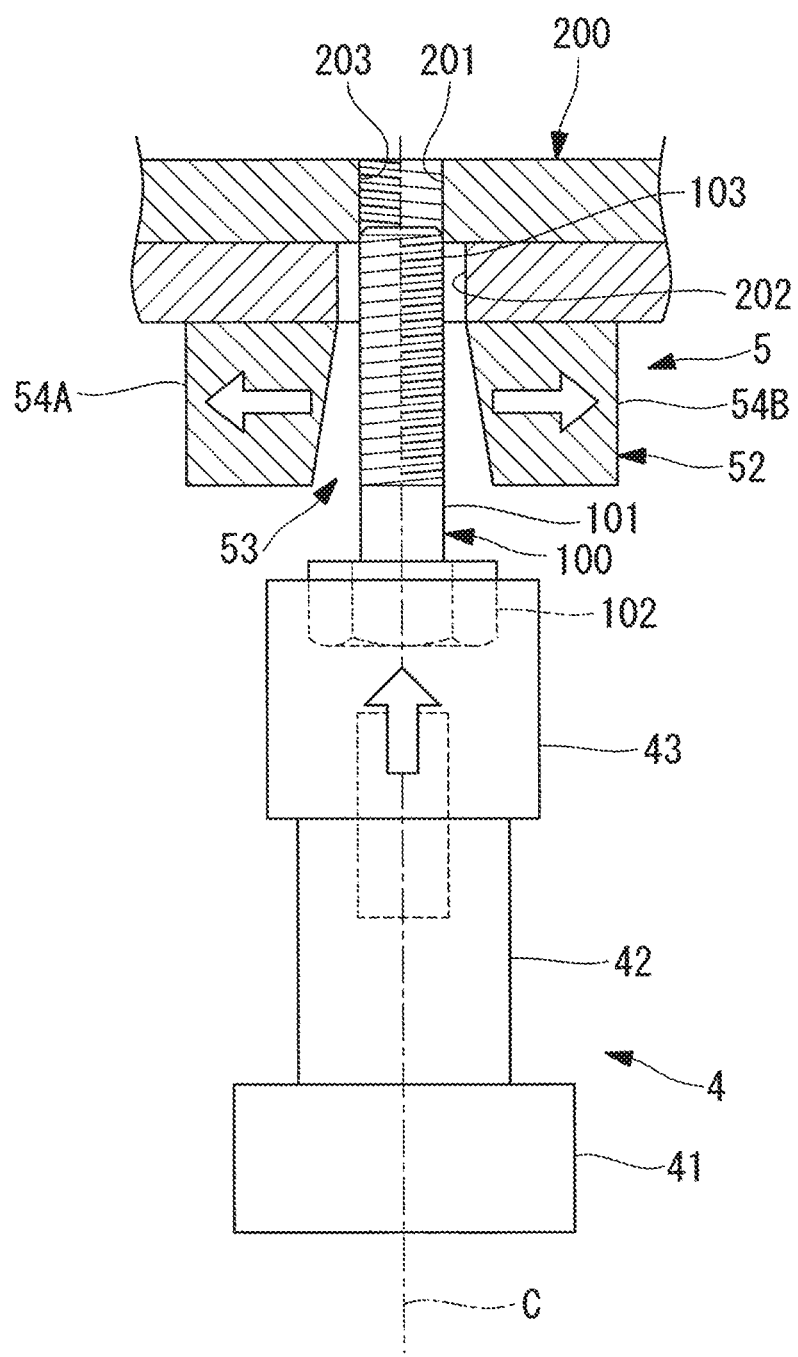
FIG. 9 is a cross-sectional view illustrating a state where a shaft section of the screw is inserted into the screw hole through a screw insert of the guide member in the closed state shown in FIG. 6.

FIG. 9 is a cross-sectional view illustrating a state where the shaft section 101 of the screw 100 is inserted into the screw hole 201 through the screw insert 53 of the guide member 52 in the closed state shown in FIG. 6.

When the screw fastening device 4 has ascended to the position where the distal end 101s of the shaft section 101 of the screw 100 has reached the female thread section 203 of the screw hole 201 in step S5, a screw fastening operation commences by rotating the screw 100. This is achieved by actuating the arm 32 of the robot 3 to move the screw fastening device 4 further upward, so that the distal end 101s of the shaft section 101 of the screw 100 is pressed against the female thread section 203 of the screw hole 201. In this state, the control device 6 actuates the screw-fastening-device body 41 of the screw fastening device 4 so as to rotate the shaft 42.

Then, as shown in FIG. 9, a male thread section 103 of the shaft section 101 of the screw 100 becomes screwed into the female thread section 203. Concurrently with the start of this screw fastening operation, the control device 6 causes the opening-closing actuator 56 to open the pair of guide bits 54A and 54B constituting the guide member 52 so as to set them in an opened state (step S6).

As shown in FIG. 7, when the guide bits 54A and 54B are opened, the diameter d1' of the screw insert 53 at the upper end thereof close to the screw hole 201 becomes larger than or equal to the head 102 of the screw 100 as well as the outer diameter ds of the socket 43, as described above.

Subsequently, the control device 6 causes the screw fastening device 4 to completely tighten the screw 100 to the screw hole 201 (step S7). This is achieved by the screw fastening device 4 causing the bearing surface of the head 102 of the screw 100 to abut on the workpiece 200 at the outer periphery of the screw hole 201 and rotating the socket 43 until the screw 100 is fastened with a predetermined torque.

The control device 6 determines whether or not the screw 100 is completely fastened to the screw hole 201 by the screw fastening device 4 (step S8). When the screw 100 is completely fastened, the control device 6 actuates the arm 32 of the robot 3 so as to move the screw fastening device 4 downward, thereby causing the socket 43 to retract downward from the head 102 of the screw 100 (step S9). This completes the process for fastening one screw 100 to one screw hole 201.

In a case where the workpiece 200 has a plurality of screw holes 201, the control device 6 determines whether or not the process for fastening screws 100 to all screw holes 201 is completed (step S10).

If the determination result indicates that the process for fastening screws 100 to all screw holes 201 is completed, the control device 6 ends the overall process.

In contrast, if the process for fastening screws 100 to all screw holes 201 is not completed, the screw fastening device 4 and the screw guide device 5 are moved to the next screw hole 201 (step S11), and the process from step S1 is repeated.

Figure 10:
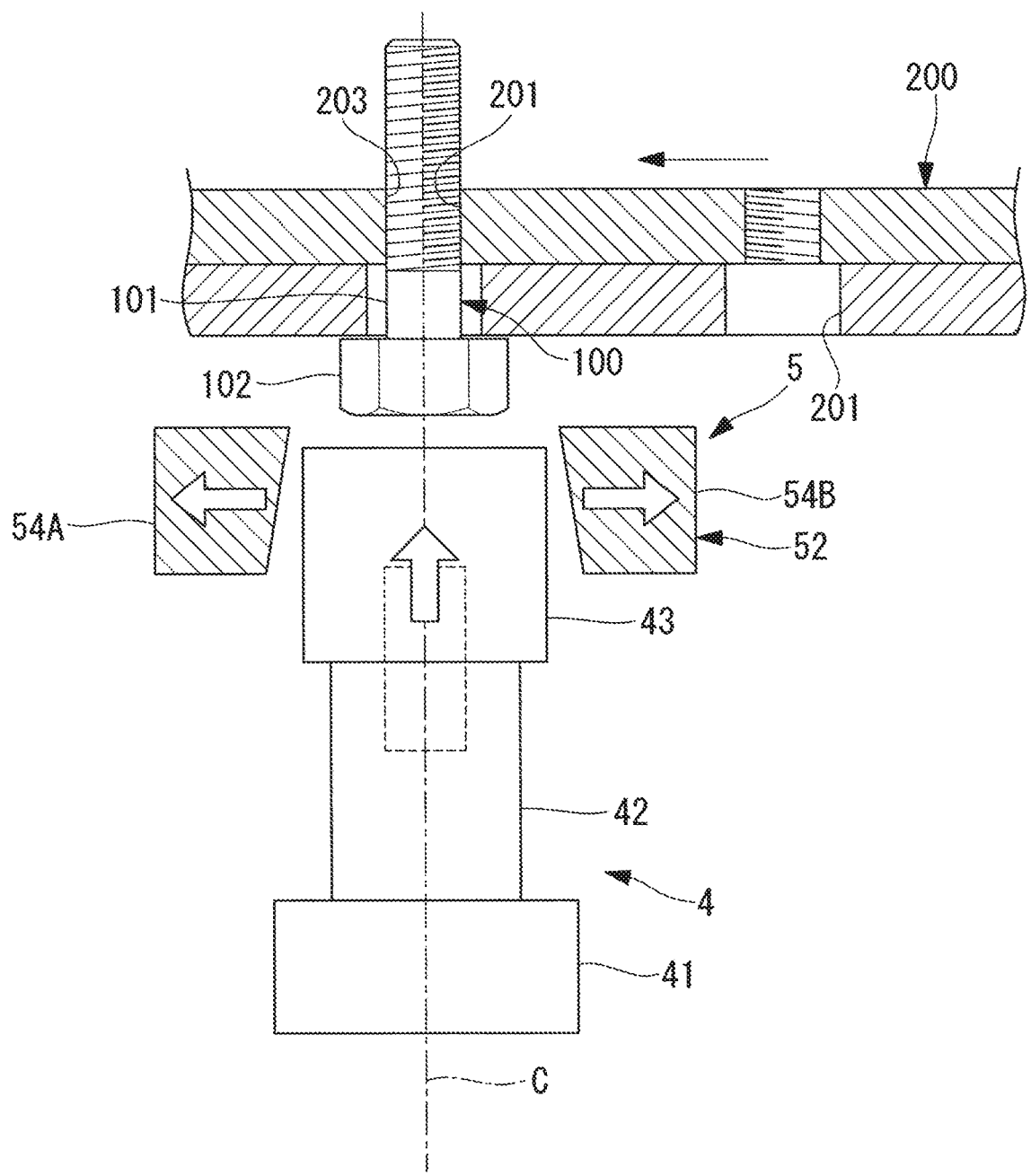
FIG. 10 is a cross-sectional view illustrating a state where the guide member in the opened state in FIG. 7 is retracted downward.

In order to move the screw guide device 5 to the next screw hole 201, the elevating actuator 58 (see FIG. 2) causes the opening-closing actuator 56 to descend in the screw guide device 5. Accordingly, as shown in FIG. 10, the guide member 52 set in the opened state in step S6 moves downward so as to be positioned lower than the head 102 of the screw 100 fastened to the workpiece 200. In this state, the workpiece support member 24 of the support 2 causes the workpiece 200 to rotate about its center, so that the next screw hole 201 is relatively moved to a position above the screw insert 53 of the guide member 52.

Subsequently, the process returns to step S1 described above so as to repeat the process for fastening the screw 100 to the next screw hole 201.

Accordingly, in the screw guide device 5 and the screw-fastening robot system 1 according to this embodiment, the screw 100 is inserted through the screw insert 53 and is fastened by using the screw fastening device 4 in a state where the screw insert 53 of the guide member 52 faces the screw hole 201, whereby the screw fastening process can be performed while the screw 100 is reliably positioned in the screw hole 201. In this case, since the screw guide device 5 is fixed due to the guide device body 51 being provided at the support 2 side (i.e., the floor F side) that supports the workpiece 200, it is not necessary to provide the screw guide device 5 at the screw fastening device 4 side. Therefore, the screw fastening device 4 can be prevented from interfering with the workpiece 200 in the vicinity of the screw hole 201.

As a result, the screw fastening process can be performed by reliably positioning the screw 100 in the screw hole 201 while suppressing a decrease in the degree of freedom of movement of the screw fastening device 4.

The pair of guide bits 54A and 54B move in the radial direction of the screw hole 201 so that the guide member 52 opens and closes in the radial direction of the shaft section 101 of the screw 100. Thus, the screw insert 53 formed in the guide member 52 in a closed state increases in diameter when the guide member 52 is in an opened state, so that the screw insert 53 can be prevented from interfering with the head 102 of the screw 100 and the screw fastening device 4. Therefore, after the shaft section 101 of the screw 100 is inserted into the screw hole 201, the process for fastening the screw 100 can be performed smoothly by the screw fastening device 4 without being interrupted by the guide member 52.

The guide member 52 is disposed at a position where it faces the opening end 202 of the screw hole 201 between the workpiece 200 and the screw fastening device 4, and the guide device body 51 is disposed at the outer side of the workpiece 200. Accordingly, the guide device body 51 is not disposed between the workpiece 200 and the screw fastening device 4, and the guide member 52 alone is located between the workpiece 200 and the screw fastening device 4. Thus, the screw fastening device 4 is less likely to interfere with the screw guide device 5, so that the degree of freedom of movement thereof increases.

The guide member 52 has the tapered guide surfaces 55 whose diameter gradually decreases toward the screw hole 201. Accordingly, when the screw 100 is inserted through the screw insert 53, the distal end 101s of the shaft section 101 of the screw 100 is guided smoothly into the screw hole 201.

The diameter d1 of the screw insert 53 at the end thereof close to the screw hole 201 is smaller than or equal to the inner diameter do of the screw hole 201. Accordingly, when the screw 100 is inserted through the screw insert 53, the distal end 101s of the shaft section 101 of the screw 100 is guided more smoothly and reliably to the screw hole 201 without being obstructed by the workpiece 200 in the vicinity of the screw hole 201.

When fastening the screw 100 to the screw hole 201 by opening and closing the guide member 52 by means of the opening-closing actuator 56, the screw 100 is guided through the screw insert 53 by setting the guide member 52 in a closed state, and the guide member 52 is set in an opened state after the screw 100 is inserted into the screw hole 201, whereby the head 102 of the screw 100 and the socket 43 can be prevented from interfering with the guide member 52.

The radial-direction advancing-retracting actuator 57 causes the guide member 52 to be positioned between the workpiece 200 and the screw fastening device 4 only when the screw 100 is to be inserted into the screw hole 201. Otherwise, the radial-direction advancing-retracting actuator 57 can cause the guide member 52 to retract. Accordingly, the screw fastening device 4 can be prevented from interfering with the guide member 52, thereby increasing the degree of freedom of movement of the screw fastening device 4. Because the radial-direction advancing-retracting actuator 57 is capable of advancing and retracting in the radial direction of the workpiece 200, the radial-direction advancing-retracting actuator 57 switches between the advancing and retracting modes in accordance with the diameter of the disk-shaped workpiece 200 supported by the support 2. Specifically, in a case where various types with different diameters are used as workpieces 200 having screw holes 201, such a case is dealt with by the radial-direction advancing-retracting actuator 57 switching between the modes.

The elevating actuator 58 causes the guide member 52 to move away from the workpiece 200 in the vertical direction in which the workpiece 200 and the screw fastening device 4 face each other, so that the guide member 52 can be prevented from interfering with the head 102 of the screw 100 fastened to the screw hole 201. Therefore, when relatively moving the screw guide device 5 and the screw fastening device 4 to another screw hole 201 after one screw 100 is fastened to one screw hole 201, the guide member 52 and the head 102 of the screw 100 fastened to the screw hole 201 can be prevented from interfering with each other.

In addition, since the distance by which the guide member 52 is moved by the elevating actuator 58 may at least be larger than or equal to the thickness of the head 102 of the screw 100, only movement over a small distance is required. This contributes to reduced cycle time required for the fastening process of the screw 100.

Although the opening-closing actuator 56 is used for opening and closing the guide bits 54A and 54B constituting the guide member 52 in the above embodiment, the configuration is not limited to this.

Figure 11:
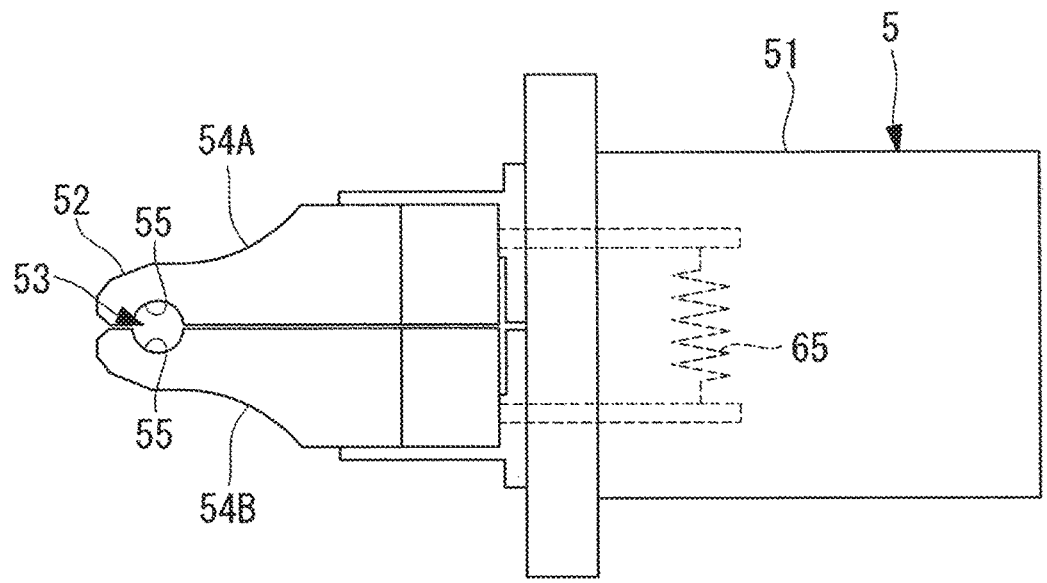
FIG. 11 is a plan view illustrating a modification of the screw guide device in FIG. 4.

For example, as shown in FIG. 11, the guide device body 51 may include a biasing member 65, such as a spring, for biasing the guide bits 54A and 54B in the closing direction.

Accordingly, when fastening the screw 100 to the screw hole 201, the screw insert 53 is formed by setting the guide member 52 in a closed state in accordance with the biasing force of the biasing member 65. When inserting the screw 100 into the screw hole 201, the head 102 of the screw 100 and the socket 43 of the screw fastening device 4 abut on the tapered guide surfaces 55 of the screw insert 53, so that the guide bits 54A and 54B constituting the guide member 52 open against the biasing force of the biasing member 65. Consequently, when tightening the screw 100, interference by the guide member 52 can be avoided.

Although the guide member 52 includes the pair of guide bits 54A and 54B in the above embodiment and the modification thereof, the configuration is not limited to this.

Figure 12:
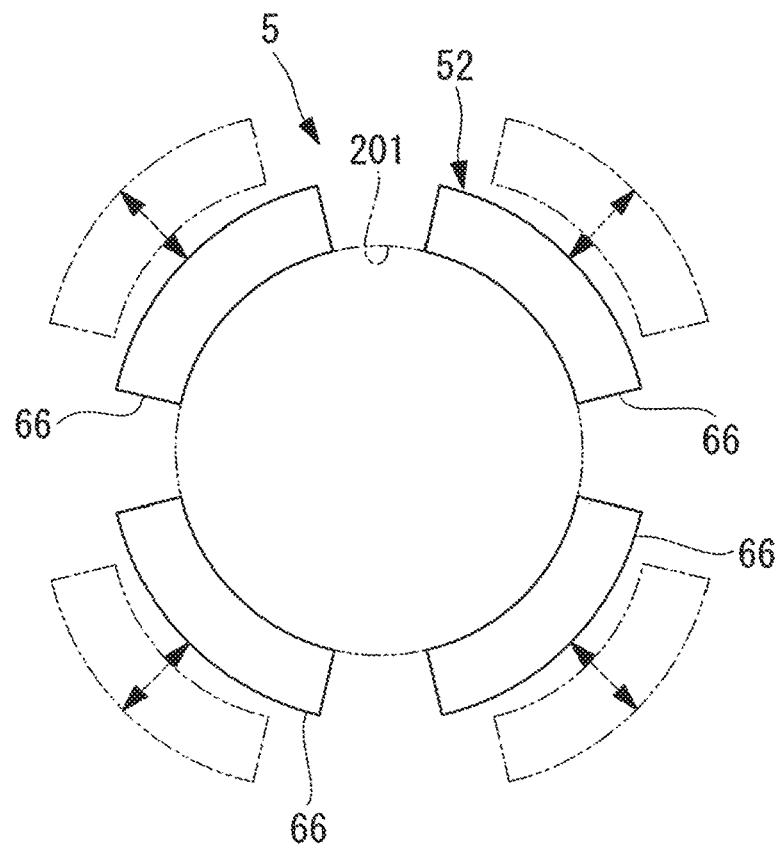
FIG. 12 is a plan view illustrating a modification of the guide member of the screw guide device in FIG. 4.

For example, as shown in FIG. 12, the guide member 52 may be constituted of a plurality of circular-arc-shaped guide bits 66 that are provided in the circumferential direction around the central axis C of the screw hole 201 and that are movable in the radial direction. Each guide bit 66 moves in the radial direction of the screw hole 201 in accordance with an actuator or a biasing force of a biasing member so as to open and close the screw insert 53.

As a result, the following forms are derived from the above-described embodiments.

An aspect of the present invention provides a screw guide device that guides a screw to a screw hole, the screw being fastened by a screw fastening device to the screw hole formed in a workpiece to be fastened. The screw guide device includes a guide device body provided at a support that supports the workpiece to be fastened, and also includes a guide member that is provided in the guide device body and that is openable and closable in a radial direction orthogonal to a central axis of a shaft section of the screw. The guide member forms a screw insert through which the shaft section is inserted when the guide member is in a closed state.

According to this aspect, the screw is inserted through the screw insert by using the screw fastening device in a state where the screw insert of the guide member faces the screw hole, whereby the screw fastening process can be performed while the screw is reliably positioned in the screw hole. In this case, since the guide device body of the screw guide device is provided at the support side that supports the workpiece to be fastened, it is not necessary to provide a screw guide device at the screw-fastening-device side. Therefore, the screw fastening device can be prevented from interfering with the workpiece to be fastened in the vicinity of the screw hole.

In the above aspect, the guide member may include a plurality of guide bits provided in a circumferential direction around a central axis of the screw. Each of the guide bits may be movable in the radial direction. The screw insert may be formed by being surrounded by the plurality of guide bits.

Accordingly, by moving the plurality of guide bits in the radial direction, the guide member opens and closes in the radial direction of the shaft section of the screw. Thus, the screw insert formed in the guide member in a closed state increases in diameter when the guide member is in an opened state, so that the screw insert can be prevented from interfering with the head of the screw and the screw fastening device.

In the above aspect, the guide member may be disposed at a position facing an opening end of the screw hole between the workpiece to be fastened and the screw fastening device, and the guide device body may be disposed at an outer side of the workpiece to be fastened in a direction intersecting with a direction in which the workpiece to be fastened and the screw fastening device face each other.

Accordingly, the guide device body is not disposed between the workpiece to be fastened and the screw fastening device, and the guide member alone is located between the workpiece to be fastened and the screw fastening device. Thus, the screw fastening device is less likely to interfere with the guide device, so that the degree of freedom of movement thereof increases.

In the above aspect, the guide member may have a tapered guide surface whose diameter gradually decreases toward the screw hole along the central axis.

Accordingly, when the screw is inserted through the screw insert, the distal end of the screw is guided smoothly into the screw hole.

In the above aspect, a diameter of the screw insert at an end thereof close to the screw hole may be smaller than or equal to an inner diameter of the screw hole.

Accordingly, when the screw is inserted through the screw insert, the distal end of the screw is guided smoothly and reliably to the screw hole without being obstructed by the workpiece to be fastened in the vicinity of the screw hole.

In the above aspect, the guide device body may be a first actuator that opens and closes the guide member in the radial direction.

Accordingly, when fastening the screw to the screw hole by opening and closing the guide member by means of the first actuator, the screw insert is formed by setting the guide member in a closed state, and the guide member is set in an opened state after the screw is inserted into the screw hole, whereby the screw can be prevented from interfering with the guide member.

In the above aspect, the screw guide device may further include a biasing member that biases the guide member in a closing direction.

Accordingly, when fastening the screw to the screw hole, the screw insert is formed by setting the guide member in a closed state in accordance with the biasing force of the biasing member. When inserting the screw into the screw hole, the head of the screw and a socket provided in the screw fastening device for fastening the screw abut on the guide member, so that the guide member opens against the biasing force of the biasing member, thereby preventing the screw from interfering with the guide member.

In the above aspect, the screw guide device may further include a second actuator that causes the guide member to retract from between the workpiece to be fastened and the screw fastening device in a direction intersecting with a direction in which the workpiece to be fastened and the screw fastening device face each other.

Accordingly, the guide member is positioned between the workpiece to be fastened and the screw fastening device only when the screw is to be inserted into the screw hole. Otherwise, the second actuator causes the guide member to retract, so that the screw fastening device can be prevented from interfering with the guide member. Consequently, the degree of freedom of movement of the screw fastening device can be increased.

In the above aspect, the screw guide device may further include a third actuator that causes the guide member to retract away from the workpiece to be fastened in a direction in which the workpiece to be fastened and the screw fastening device face each other.

Accordingly, the third actuator causes the guide member to move away from the workpiece to be fastened in the direction in which the workpiece to be fastened and the screw fastening device face each other, so that the guide member can be prevented from interfering with the head of the screw fastened to the screw hole. Therefore, for example, in a case where a plurality of screw holes are formed in the workpiece to be fastened, when moving the guide member and the screw fastening device to another screw hole after one screw is fastened to one screw hole, the guide member can be prevented from interfering with the head of the screw fastened to the one screw hole.

Another aspect of the present invention provides a screw-fastening robot system including the aforementioned screw guide device, a support that supports the workpiece to be fastened having the screw hole, a robot having an arm that is movable relative to the workpiece to be fastened, the screw fastening device that is attached to a distal end of the arm and that fastens the screw to the screw hole in the workpiece to be fastened, and a control device that controls the robot, the screw fastening device, and the screw guide device.

According to this aspect, in a state where the screw insert of the guide member faces the screw hole, the screw is inserted through the screw insert by using the screw fastening device attached to the distal end of the arm of the robot, thereby fastening the screw to the screw hole. Accordingly, the screw fastening process can be performed while the screw is reliably positioned in the screw hole. In this case, since the guide device body of the screw guide device is provided at the support side that supports the workpiece to be fastened, it is not necessary to provide the screw guide device at the screw-fastening-device side. Therefore, the screw fastening device can be prevented from interfering with the workpiece to be fastened in the vicinity of the screw hole.

REFERENCE SIGNS LIST 1 screw-fastening robot system
2 support
3 robot
4 screw fastening device
5 screw guide device
6 control device
51 guide device body
52 guide member
53 screw insert
54A, 54B guide bit
55 guide surface
56 opening-closing actuator (first actuator)
57 radial-direction advancing-retracting actuator (second actuator)
58 elevating actuator (third actuator)
65 biasing member
100 screw
101 shaft section
101s distal end
102 head
200 workpiece to be fastened
201 screw hole
202 opening end
C central axis
d1 diameter
dn inner diameter

The invention claimed is:

1. A screw-fastening robot system comprising:
a screw guide device that guides a screw to a screw hole extending in a vertical direction;
a robot having an arm that is movable relative to a workpiece to be fastened, the screw hole being formed in the workpiece to be fastened; and
a support that is provided on a floor and that supports the workpiece to be fastened;
wherein the screw guide device comprises:
a guide member that is openable and closable, the guide member having a diameter into which a shaft section of the screw is insertable in a closed state and having a diameter into which a head of the screw is insertable in an opened state; and
a support member that is provided on the floor and that supports the guide member,
wherein the support member supports the guide member so that the guide member is positioned below the screw hole to allow the screw to be inserted into the screw hole from below through the guide member, and
wherein the support member is provided closer to the support than the robot.

2. The screw-fastening robot system according to claim 1, wherein the guide member includes a plurality of guide bits provided in a circumferential direction around a central axis of the screw, each of the guide bits being moved in a horizontal direction, and
wherein the guide member is openable and closable by the plurality of guide bits being moved.

3. The screw-fastening robot system according to claim 1, wherein the diameter of the guide member gradually decreases toward the screw hole.

4. The screw-fastening robot system according to claim 3, wherein the diameter of the guide member at an end thereof close to the screw hole is smaller than or equal to an inner diameter of the screw hole in the closed state.

5. The screw-fastening robot system according to claim 1, further comprising:
an opening-closing actuator that opens and closes the guide member in a horizontal direction.

6. The screw-fastening robot system according to claim 1, further comprising:
a spring that is configured to bias the guide member in a closing direction.

7. The screw-fastening robot system according to claim 1, further comprising:
a radial-direction advancing-retracting actuator that causes the guide member to be moved in a horizontal direction.

8. The screw-fastening robot system according to claim 1, further comprising:
an elevating actuator that causes the guide member to be moved in the vertical direction.

9. The screw-fastening robot system according to claim 1, further comprising:
a screw fastening device that is attached to a distal end of the arm and that fastens the screw to the screw hole in the workpiece to be fastened from a lower side toward an upper side of the workpiece to be fastened; and
a control device that controls the robot, the screw fastening device, and the screw guide device.

10. The screw-fastening robot system according to claim 9,
wherein the workpiece to be fastened is a disk-shaped member that has an outer peripheral section provided with a plurality of screw holes arranged in the circumferential direction, and
the support supports the workpiece to be fastened in a rotatable manner about the center of the workpiece to be fastened.

* * * * *